United States Patent
Khan

(10) Patent No.: US 7,577,128 B2
(45) Date of Patent: Aug. 18, 2009

(54) MULTIPLEXING SCHEME FOR UNICAST AND BROADCAST/MULTICAST TRAFFIC

(75) Inventor: Farooq Ullah Khan, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/906,309

(22) Filed: Oct. 1, 2007

(65) Prior Publication Data

US 2008/0095140 A1  Apr. 24, 2008

(51) Int. Cl.
  *H04J 3/00*  (2006.01)

(52) U.S. Cl. .................. 370/345; 370/395.4; 370/442; 370/538; 375/299; 375/347

(58) Field of Classification Search ............... 370/314, 370/337, 395.4, 322, 345, 442, 348, 443, 370/537, 538; 455/443, 448, 447, 445, 446; 375/299, 347
See application file for complete search history.

(56) References Cited

U.S. PATENT DOCUMENTS

| | | | | | |
|---|---|---|---|---|---|
| 6,011,786 | A | * | 1/2000 | Dent | 370/330 |
| 6,888,805 | B2 | * | 5/2005 | Bender et al. | 370/314 |
| 7,181,666 | B2 | * | 2/2007 | Grob et al. | 714/748 |
| 7,245,594 | B1 | * | 7/2007 | Esteves et al. | 370/322 |
| 2002/0020211 | A1 | * | 2/2002 | Lambertz et al. | 73/116 |
| 2004/0198404 | A1 | * | 10/2004 | Attar et al. | 455/522 |
| 2005/0020295 | A1 | * | 1/2005 | Attar et al. | 455/522 |
| 2005/0052991 | A1 | * | 3/2005 | Kadous | 370/216 |
| 2005/0207505 | A1 | * | 9/2005 | Lakkis | 375/260 |

OTHER PUBLICATIONS

European Search Report EP 05 25 5121 dated Oct. 28, 2005.

* cited by examiner

*Primary Examiner*—George Eng
*Assistant Examiner*—Brandon J Miller

(57) ABSTRACT

A method is provided for efficiently multiplexing interlaced broadcast traffic over a wireless network. The multiplexing scheme organizes unused slots in at least some base stations so that unicast traffic employing hybrid ARQ may be delivered therein.

11 Claims, 4 Drawing Sheets

| Slot# | 1 | 2 | 3 | 4 | 5 | 6 | 7 | 8 | 9 | 10 | 11 | 12 |
|---|---|---|---|---|---|---|---|---|---|---|---|---|
| BS set A | 1 SP11 | 2 | 3 | 4 | 1 SP21 | 2 | 3 | 4 | 1 SP31 | 2 | 3 | 4 |

| Slot# | 1 | 2 | 3 | 4 | 5 | 6 | 7 | 8 | 9 | 10 | 11 | 12 |
|---|---|---|---|---|---|---|---|---|---|---|---|---|
| BS set B | 1 SP11 | 2 SP12 | 3 | 4 | 1 SP21 | 2 SP22 | 3 | 4 | 1 SP31 | 2 SP32 | 3 | 4 |

| Slot# | 1 | 2 | 3 | 4 | 5 | 6 | 7 | 8 | 9 | 10 | 11 | 12 |
|---|---|---|---|---|---|---|---|---|---|---|---|---|
| BS set C | 1 SP11 | 2 SP12 | 3 SP13 | 4 | 1 SP21 | 2 SP22 | 3 SP23 | 4 | 1 SP31 | 2 SP32 | 3 SP33 | 4 |

FIGURE 7

| Slot# | 1 | 2 | 3 | 4 | 5 | 6 | 7 | 8 | 9 | 10 | 11 | 12 |
|---|---|---|---|---|---|---|---|---|---|---|---|---|
| BS set A | 1 SP11 | 2 | 3 | 4 | 1 SP21 | 2 | 3 | 4 | 1 | 2 | 3 | 4 |

| Slot# | 1 | 2 | 3 | 4 | 5 | 6 | 7 | 8 | 9 | 10 | 11 | 12 |
|---|---|---|---|---|---|---|---|---|---|---|---|---|
| BS set B | 1 SP11 | 2 SP12 | 3 | 4 | 1 SP21 | 2 | 3 | 4 | 1 SP22 | 2 | 3 | 4 |

| Slot# | 1 | 2 | 3 | 4 | 5 | 6 | 7 | 8 | 9 | 10 | 11 | 12 |
|---|---|---|---|---|---|---|---|---|---|---|---|---|
| BS set C | 1 SP11 | 2 SP12 | 3 | 4 | 1 SP21 | 2 SP13 | 3 | 4 | 1 SP22 | 2 SP23 | 3 | 4 |

FIGURE 8

MULTIPLEXING SCHEME FOR UNICAST AND BROADCAST/MULTICAST TRAFFIC

BACKGROUND OF THE INVENTION

1. Field of the Invention

This invention relates generally to telecommunications, and more particularly, to wireless communications.

2. Description of the Related Art

In the field of wireless data systems, a number of well-known standards, such as 1x-EV-DO, 1xEV-DV as well as the High Speed Downlink Packet Access (HSDPA) specification in the Universal Mobile Telecommunication System (UMTS) standard, have been employed. Newer technologies such as fast scheduling, adaptive modulation and coding (AMC) and hybrid ARQ (HARQ) have also been introduced to improve overall system capacity. However, application of the above-mentioned techniques has been limited to transmitting data blocks for unicast traffic, i.e. a data block addressed to a single mobile station. In general, a scheduler selects a user for transmission at a given time and adaptive modulation and coding is used to select an appropriate transport format (modulation and coding) for current channel conditions seen by the user. Due to errors in channel quality estimates, a relatively high level of frame errors may occur in the transmissions performed at a given rate (transport format). Hybrid ARQ has been employed to recover from transmission errors without significant loss in throughput.

An example of hybrid ARQ operation for the 1xEV-DO system is shown in FIG. 1. The hybrid ARQ transmissions use a 4-slot interlacing structure, i.e. the hybrid ARQ retransmissions for an original transmission in slot n happens in slots (n+4), (n+8), and so on. A total of 4 interlaces are available for transmission to a single user or for transmissions to different users. In the example shown in FIG. 1, a new or first data transmission occurs in slot 2 on interlace 2. In the exemplary scenario illustrated in FIG. 1, the transmission is unsuccessfully received and the receiver sends back a negative acknowledgement signal (NACK). The NACK indicates to the transmitter that the transmission was not properly received, causing the transmitter to retransmit the same data in slot 6 (again on interlace 2). The receiver combines the retransmitted data with the previously received first transmission, and based on the two pieces of data, the transmission is successfully decoded. Those skilled in the art will appreciate that the process of retransmitting and combining may be repeated until the data is successfully received (early termination, as indicated by an ACK) or a fixed number of attempts have been made. Once the data is properly received, the receiver sends back an acknowledgement signal (ACK). The transmitter then starts another new transmission on interlace 2 in slot 10. Similarly, the transmissions happens in parallel on other interlaces, such as 1, 3 and 4.

Unlike unicast traffic, broadcast/multicast data blocks are addressed to more than one receiver or mobile station. In a broadcast transmission, the data blocks are addressed to all the mobiles in the system, whereas in a multicast transmission, the data blocks are addressed to a subset of mobiles in the system. In general, no feedback is required from the mobile stations. Generally, in both multicast and broadcast transmissions, the data blocks are transmitted on a predetermined number of slots, i.e. there is no early termination due to hybrid ARQ ACK feedback.

A stylized representation of a wireless system capable of broadcast data packet transmission is shown in FIG. 2. The broadcast data packet contains information from one or more broadcast streams carrying broadcast programs. In general, two layers of channel coding are used to provide robustness against errors. The first layer of coding also called outer code is performed using well-known Reed-Solomon code. The Reed-Solomon code adds some redundancy to the data. The Reed-Solomon coded block is then segmented into smaller data blocks for Turbo coding. A number of subpackets (e.g., SP1-SP3) from the same data block are created at the output of the Turbo coding. In general, the data block can be recovered from any one of the received subpackets (SP1-SP3) as long as the coding rate is smaller than 1. Table 1 shows data rates for a 3072 bit data block transmitted within one, two or three slots (subpackets). A subpacket is transmitted within a slot of duration 1.67 ms. The received subpackets at the mobile receiver are used to recover the data block. The data blocks are then reassembled to form the broadcast packet.

TABLE I

| Number of subpackets (slots) transmission | Data Rate |
| --- | --- |
| 1 | 1843.2 Kb/s |
| 2 | 921.6 Kb/s |
| 3 | 614.4 Kb/s |

The broadcast and unicast traffic in the 1xEV-DO system is multiplexed on an interlace-by-interlace basis. In the example shown in FIG. 3, interlace 1 is used for broadcast traffic. The broadcast data block is transmitted in three subpackets (SP1, SP2 and SP3) on three slots i.e. slot # 1, 5 and 9 from the entire system, i.e., all of the base stations in the system. Therefore, the mobile station can potentially receive and combine signals from multiple base stations. The mobile station also combines SP1, SP2 and SP3 transmissions in order to recover the broadcast data block. The SP2 and SP3 transmissions contain additional redundancy for broadcast data block recovery.

The interlace-based multiplexing approach used in the prior art poses problems when different broadcast data rates are used by different base stations in different cells in the system. The use of different data rates in different cells may be the case in a system deployment where the cell sizes are different. This, for example, can be the case, for a downtown area surrounded by suburbs and rural areas. The cell size in densely populated areas is smaller in order to provide more cell sites to accommodate the larger amounts of traffic. However, as the population density decreases in the surrounding suburbs and rural areas, the effective cell sizes increases. The smaller cells deployments can in general support higher data rates because of the smaller path loss due to relatively shorter distance between the base station and the mobile station. The larger cells have, in general, larger path loss and therefore cannot support very high data rates. An example of cell layout showing three sets of cells is stylistically shown in FIG. 4. A set of 7 center cells is labeled as set A. A first and second ring of cells around set A are labeled as set B and set C, respectively.

An example of broadcast transmissions at different data rates in different sets of cells is shown in FIG. 5. In this example, set A transmits only SP1 of the broadcast data block, achieving the highest transmission data rate. Set B transmits both SP1 and SP2 of the broadcast data block therefore achieving half the data rate of set A rate. Similarly, set C achieves one-third rate of set A because the broadcast data block is transmitted in three subpackets. Note that SP2 and SP3 contain additional redundancy. Therefore, if a transmission can be decoded using a smaller number of subpackets, the achieved information data rate is higher.

An example of a broadcast transmission over three interlaces is shown in FIG. 6. Each of the interlaces carries a broadcast data block consisting of one, two or three subpackets. In this example, sets A, B and C transmit the broadcast data block in one, two and three subpackets, respectively. The fourth interlace is used for the unicast traffic. In set C, slots 1, 2, 3, 5, 6, 7, 9, 10, 11 are used for the broadcast traffic while slots 4, 8 and 12 in interlace #4 are used for the unicast traffic. In FIG. 6, SPij denoted the jth subpacket from the ith data block. For example, SP21 represents the first subpacket from the second data block. The subpackets transmitted from multiple cells at the same time with the same subpacket number can potentially be soft combined at the receiver to assist in decoding the data packet. In FIG. 6, SP11, SP21 and SP31 are transmitted from all the three sets of cells A-C at the same time, and, therefore, these subpackets received from all the cells are combined at the receiver. Similarly, SP12, SP22, and SP32 are transmitted from cell set B and cell set C. Therefore, these subpackets are soft combined from cell set B and cell set C. On the other hand cell set A may potentially be transmitting unicast traffic during slots 5, 6 and 7 when SP12, SP22 and SP32 are transmitted from cell set B and cell set C. Therefore, transmissions from cell set A potentially interfere with transmissions from cell set B and cell set C. SP13, SP23, and SP33 are transmitted from cell set C only. Therefore, these subpackets potentially get interference from both cell set A and cell set B.

In cell set B, slots 9, 10 and 11 are not used for broadcast traffic because the broadcast data blocks are transmitted in two subpackets only. Therefore, these free slots can potentially be considered for transmission of other information, such as unicast traffic. However, the unicast traffic uses hybrid ARQ and potentially requires multiple retransmission attempts. For example, if a unicast data block transmission is started in slot#9, the retransmission needs to happen in slot#13, but slot#13 belonging to interlace#1 is reserved for a broadcast data block transmission. Therefore, a retransmission cannot be performed for unicast traffic. Similarly, in cell set A, slots 5, 6, 7, 9, 10 and 11 become available, but like slots 9, 10 and 11 in cell set B, these slots may not be used for unicast traffic due to restrictions on retransmissions. Thus, these unused slots remain unavailable, and, therefore, the multiplexing approach used in the prior art poses serious restrictions on scheduling and results in system inefficiency.

The present invention is directed to overcoming, or at least reducing, the effects of, one or more of the problems set forth above.

SUMMARY OF THE INVENTION

In one embodiment of the present invention, a method is provided for coordinating transmissions within a first and second cell. The method comprises transforming a first block of broadcast information into first and second subpackets; transmitting the first subpacket within the first and second cells during a first time slot; and transmitting the second subpacket within the second cell during a second time slot. A second block of the broadcast information is transformed into third and fourth subpackets, the third subpacket is transmitted within the first and second cells during an n+1 time slot, and the fourth subpacket is transmitted within the second cell during an n+2 time slot.

In another embodiment of the present invention, a method is provided for receiving broadcast transmissions from a first and second cell. The method comprises receiving a first subpacket from the first and second cells during a first time slot; receiving a second subpacket from the second cell during a second time slot; and combining the first subpackets received from the first and second cells. A third subpacket is received from the first and second cells during an n+1 time slot. A fourth subpacket is received from the second cell during an n+2 time slot. The third subpackets received from the first and second cells are combined. A first subpacket of unicast information is received from the first cell during the second time slot, and a retransmission of the first subpacket of unicast information is received from the first cell during the n+2 time slot.

BRIEF DESCRIPTION OF THE DRAWINGS

The invention may be understood by reference to the following description taken in conjunction with the accompanying drawings, in which like reference numerals identify like elements, and in which:

Figures 5, 6:
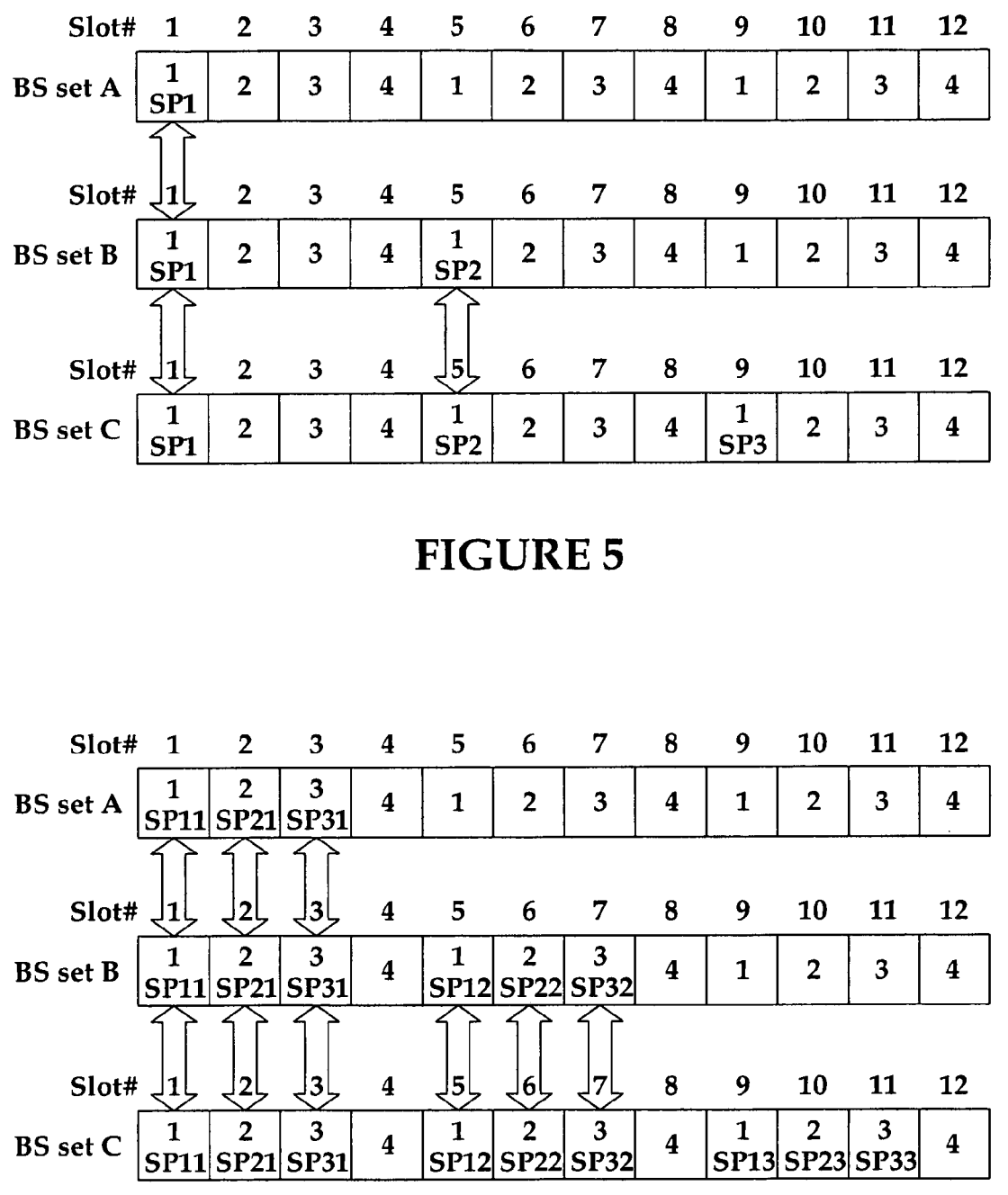

FIG. 5 illustrates an exemplary embodiment of a multiplexing scheme for broadcast transmissions at different data rates in different sets of cells;

FIG. 6 illustrates an exemplary embodiment of a broadcast transmission over three interlaces;

FIG. 7 stylistically illustrates an exemplary embodiment of a data block transmission according to one aspect of the current invention; and FIG. 8 stylistically illustrates an alternative exemplary embodiment of a data block transmission according to one aspect of the current invention.

Figure 1:
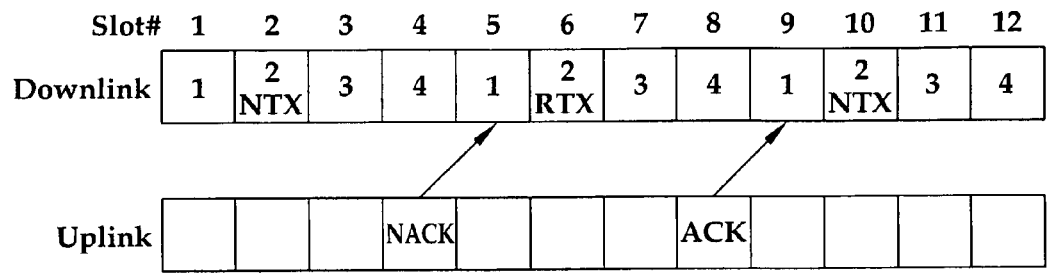
FIG. 1 illustrates a stylized representation of hybrid ARQ operation for a 1xEV-DO system.
Figure 2:
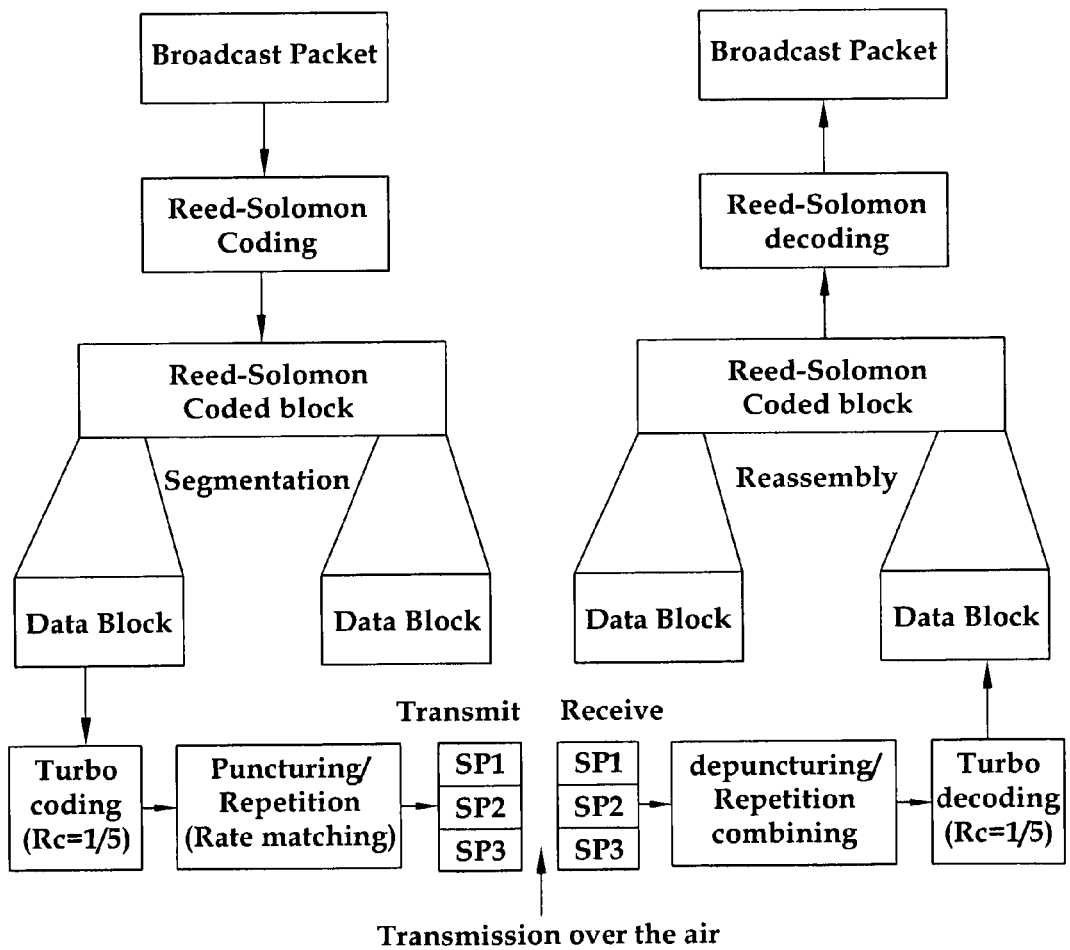
FIG. 2 illustrates a stylized representation of a wireless system capable of broadcast data packet transmission.
Figures 3, 4:
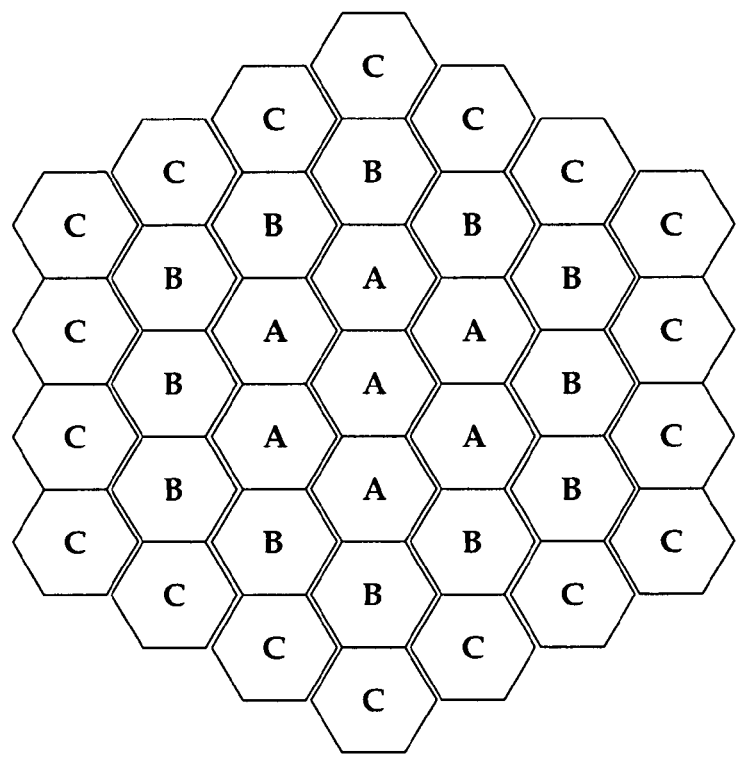
FIG. 3 illustrates one scheme for multiplexing broadcast and unicast traffic in the 1xEV-DO system on an interlace-by-interlace basis.
FIG. 4 illustrates an exemplary cell layout showing three sets of cells, each transmitting at different rates.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but would nevertheless be a routine undertaking for those of ordinary skill in the art having the benefit of this disclosure.

The present invention presents a new multiplexing scheme for unicast and broadcast traffic. Generally, the multiplexing scheme of the instant invention overcomes the scheduling restrictions in the prior art to allow use of HARQ transmissions and retransmissions of unicast data during slots that would otherwise be unused by broadcast operations.

One example of data block transmission according to one aspect of the current invention is illustrated in FIG. 7. In the illustrated embodiment, it is assumed that cell sets A, B and C use data rates of 1843.2, 921.6 and 614.4 Kb/s, respectively. As given in Table 1, these three data rates are achieved by transmitting one, two and three subpackets (slots) for a data block of size 3072 bits. Therefore, cell sets A, B and C transmit one, two and three subpackets (slots), respectively, for each data block. In one embodiment of the instant invention, the subpackets from a given data block are transmitted contiguously. For example, subpackets SP11, SP12 and SP13 from data block number 1 are transmitted in slot 1, 2 and 3 respectively from cell set C. Similarly, SP11 and SP12 are transmitted from cell set B in slots 1 and 2, respectively. Cell set A transmits only subpacket SP11 in slot number 1. A receiver that receives the SP11 subpacket from at least one cell in more than one of the cell sets A, B and C may combine the SP11 subpackets to correct for transmission errors. It should be appreciated that if the receiver receives subpacket SP11 from all three of the cell sets A, B and C, then all three of the received subpackets may be combined, whereas if the receiver receives subpacket SP11 from only two of the cell sets A, B and C, then the two received subpackets may be combined.

Similarly, the SP12 subpacket may be combined from cell set B and cell set C. It should be noted that in the illustrated embodiment of the instant invention, the same number of soft combinings of the subpackets can be performed as in the prior art scheme; however, the slots not used for broadcast in cells using relatively higher data rates can now be used for unicast traffic without scheduling restrictions. That is, using the illustrated multiplexing scheme allows conventional HARQ transmissions and retransmissions of unicast data during the unused time slots of the higher speed cells. For example in cell set B, the slots 3, 7 and 11, which belong to interlace 3, are free from broadcast traffic, and may be used for unicast traffic requiring hybrid ARQ retransmissions. That is, in cell set B, slots 3, 7 and 11 will always be free for transmissions and retransmissions. In other terms, interlace 3 in cell set B will always be available for unicast traffic.

Similarly, interlaces 2 and 3 are both free in cell set A. One advantage of the present invention is it makes complete interlaces available rather than some slots within an interlace. In other words, the present invention minimizes the number of interlaces allocated for broadcast traffic in a given set of cells. Unicast traffic can be carried over an interlace without any scheduling and retransmission restrictions because any number of retransmissions can be performed within that interlace. For example, assuming that two retransmissions are permitted, then the first transmission may occur in slot 2, while the two subsequent retransmissions may occur in slots 6 and 10. Further, assuming that three retransmissions are permitted, then the first transmission may occur in slot 2, while the first two subsequent retransmissions may occur in slots 6 and 10, and the third retransmission may take place in slot 14. In this manner, any number of retransmissions may be permitted.

Those skilled in the art will appreciate that the subpackets received from multiple cells can be combined in any of a variety of ways. When an Orthogonal Frequency Division Multiplexing (OFDM) technique is used for subpacket transmission, an FFT (Fast Fourier Transform) operation may be performed on the composite signal received from each of the cells. Therefore, the signal combining happens as part of the OFDM demodulation. Alternatively, in the case of CDMA using a RAKE receiver, the received signal from each of the RAKE fingers may be combined. A RAKE finger may be used to track and demodulate a signal received from one cell. Therefore, the number of available RAKE fingers limits the maximum number of cells from which the subpackets can be combined. An equalizer can also be employed for decoding signals received from multiple cells.

Turning now to FIG. 8, an alternative multiplexing scheme is stylistically illustrated. In this exemplary embodiment, cell set C requires only two interlaces for transmission at the lowest data rate of 614.4 Kb/s. The subpackets SP11 and SP12 are transmitted contiguously in slots 1 and 2 in cell set C. The third subpacket from the first block, i.e., SP13 is transmitted subsequently in slot 6. The first subpacket from the second data block SP21 is transmitted in slot 5. Therefore, the third subpacket from the first data block SP13 is transmitted after first subpacket from the second data block SP21, i.e., an out-of-order transmission of subpackets. This out-of-order transmission allows combining of SP21 across cell sets A, B and C while requiring only one interlace for broadcast traffic in cell set A. In prior art multiplexing schemes, two interlaces would have been blocked by the broadcast traffic in the whole system (cell set A, B and C). The number of soft combinings allowed by the present invention is the same as in the prior art.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for coordinating transmissions within a first and second cell using an n-slot interlacing structure, the method comprising:

transforming a first block of broadcast information into first and second subpackets;

transmitting the first subpacket within the first and second cells during a first time slot;

transmitting the second subpacket within the second cell during a second time slot while bypassing transmission of the second subpacket within the first cell during the second time slot, and wherein a first data rate used to transmit the first block of broadcast information in the first cell is larger than a second data rate used to transmit the first block of broadcast information in the second cell;

transforming a second block of the broadcast information into third and fourth subpackets;

transmitting the third subpacket within the first and second cells during an n+1 time slot; and transmitting the fourth subpacket within the second cell during an n+2 time slot and bypassing transmission of the fourth subpacket within the first cell during the n+2 time slot.

2. A method, as set forth in claim 1, further comprising:
transmitting unicast information within the first cell during the second time slot; and
retransmitting the unicast information within the first cell during the n+2 time slot.

3. A method, as set forth in claim 2, wherein retransmitting the unicast information within the first cell during the n+2 time slot occurs in response to receiving a negative acknowledgement signal in response to transmitting unicast information within the first cell during the second time slot.

4. A method, as set forth in claim 2, further comprising terminating retransmission of the unicast information with the first cell during the n+2 time slot in response to receiving an acknowledgement signal in response to transmitting unicast information within the first cell during the second time slot.

5. A method for receiving broadcast transmissions from a first and second cell using an n-slot interlacing structure, the method comprising:
receiving a first subpacket from the first and second cells during a first time slot;
receiving a second subpacket from the second cell during a second time slot, wherein transmission of the second subpacket within the first cell during the second time slot has been bypassed, and wherein a first data rate used to transmit the first block of broadcast information in the first cell is larger than a second data rate used to transmit the first block of broadcast information in the second cell;
combining the first subpackets received from the first and second cells;
receiving a third subpacket from the first and second cells during an n+1 time slot;
receiving a fourth subpacket from the second cell during an n+2 time slot, wherein transmission of the fourth subpacket within the first cell during the n+2 time slot has been bypassed;
combining the third subpackets received from the first and second cells;
receiving a first subpacket of unicast information from the first cell during the second time slot; and
receiving a retransmission of the first subpacket of unicast information from the first cell during the n+2 time slot.

6. A method for coordinating transmissions within a first and second cell using an n-slot interlacing structure comprising a plurality of n-slot interlaces, the method comprising:
forming a plurality of first and second subpackets from a plurality of blocks of broadcast information;
periodically transmitting one of the first subpackets within the first and second cells during a first common time slot in each n-slot interlace;
periodically transmitting one of the second subpackets within the second cell during a second common time slot in each n-slot interlace while bypassing transmission of said one of the first subpackets within the first cell during the second common time slot, and wherein a first data rate used by the first cell is larger than a second data rate used by the second cell;
transmitting unicast information in at least a portion of the slots in each n-slot structure that are free from transmissions of the first and second subpackets.

7. A method, as set forth in claim 6, wherein transmitting unicast information in at least a portion of the slots in each n-slot interlace that are free from transmissions of the first and second subpackets further comprises:
forming a plurality of subpackets from the unicast information; and
transmitting the unicast subpackets within the first cell during the second common time slot in each n-slot interlacing structure.

8. A method, as set forth in claim 7, wherein transmitting the unicast subpackets within the first cell during the second common time slot in each n-slot interlace is terminated in response to receiving an acknowledgement signal.

9. A method for coordinating transmissions within a first, a second, and a third cell using a 4-slot interlacing structure, the method comprising:
transforming a first block of broadcast information into a first subpacket, a second subpacket, and a third subpacket;
transmitting the first subpacket within the first, second, and third cells during a first time slot;
transmitting the second subpacket within the second and third cells during a second time slot while bypassing transmission of the second subpacket within the first cell during the second time slot, wherein a first data rate used to transmit the first block of broadcast information in the first cell is larger than a second data rate used to transmit the first block of broadcast information in the second cell;
transmitting the third subpacket within the third cell during a third time slot while bypassing transmission of the third subpacket within the first and second cells during the third time slot, wherein the first and second data rates used to transmit the first block of broadcast information in the first and second cells are larger than a third data rate used to transmit the first block of broadcast information in the third cell;
transforming a second block of the broadcast information into fourth, fifth, and sixth subpackets;
transmitting the fourth subpacket within the first, second, and third cells during an n+1 time slot;
transmitting the fifth subpacket within the second and third cells during an n+2 time slot while bypassing transmission of the fifth subpacket within the first cell during the n+2 time slot; and
transmitting the sixth of subpacket within the third cell during an n+3 time slot while bypassing transmission of the sixth subpacket within the first and second cells during the n+3 time slot.

10. A method, as set forth in claim 9, further comprising:
transmitting unicast information within the first cell during the second time slot;
retransmitting the unicast information within the first cell during the n+2 time slot.

11. A method, as set forth in claim 9, further comprising:
transmitting unicast information within the first and second cells during the third time slot;
retransmitting the unicast information within the first and second cells during the n+3 time slot.

* * * * *